3,235,611
TELOMERS OF TETRAFLUOROETHYLENE
AND TETRACHLOROETHYLENE
Gaines C. Jeffrey, Freeport, Tex., assignor to The Dow Chemical Company, Midland, Mich., a corporation of Delaware
No Drawing. Filed Nov. 8, 1962, Ser. No. 236,397
4 Claims. (Cl. 260—653.1)

This invention relates to new unsaturated perhalogenated teleomers and to a process whereby these polymeric compositions may be prepared.

Telomeric halocarbons whose structure consists of chains of recurring tetrafluoroethylene units terminated at one end by a chlorine atom and at the other end by the radical of a saturated aliphatic chlorine-containing compound are described by Hanford et al. in U.S. Patent 2,562,547. These materials are prepared by heating tetrafluoroethylene with a saturated chlorinated hydrocarbon such as carbon tetrachloride in the presence of a peroxide catalyst. The specification emphasizes that the chlorinated hydrocarbon must be free of aliphatic unsaturation. British Patent 796,326 describes a process for making polymers of tetrafluoroethylene, chlorotrifluoroethylene, and similar fluoro or chlorofluoroolefins wherein these monomers are heated in the presence of tetrachloroethylene and a peroxide. This process is characterized by the production of pure polymers of the fluorine-containing olefin and the total absence of telomers resulting from participation in the reaction of the tetrachloroethylene.

Therefore, it is surprising and unexpected to find that when tetrafluoroethylene and tetrachloroethylene are contacted in the presence of a field of high energy ionizing radiation, the polymeric product thereby obtained is composed essentially of telomers having the formula $$Cl_2C=CCl(C_2F_4)_nCl$$

wherein $n$ is a number from two to about twenty. These telomers range from high-boiling oils and greases when $n$ is small to solids melting at temperatures up to 150–200° C. when $n$ is large. The members of this family of products are characteristically highly water-repellent and are efficient lubricants.

The polymerization process is carried out most efficiently when the tetrachloroethylene reactant is maintained in the liquid phase and gaseous tetrafluoroethylene is dispersed or dissolved therein. Gas phase reaction is also possible. The reaction temperature may range from about −20° C. to about 150° C. and it is preferably about 10–50° C. The reaction pressure is not a critical factor, but the process is usually most conveniently operated under moderate superatmospheric pressure, for example, about 5–100 p.s.i.g. Pressures outside this preferred range may also be employed.

The tetrachloroethylene is best used in large molar excess over the tetrafluoroethylene. Although the reaction may be run using lower molar proportions, particularly in the gas phase reaction, it is usually most convenient to use tetrachloroethylene in 10/1 to 50/1 molar excess, thereby obtaining the polymerized product as an easily handled slurry or dispersion.

As the catalytic initiator for this polymerization, high energy ionizing radiation of at least five or ten thousand rads per hour intensity is suitable and intensities as great as ten megarads per hour may be employed. Preferably, the high energy radiation is utilized at an intensity between about ten thousand and one million rads per hour. The reaction is allowed to proceed for a time sufficient to produce polymer of the type desired in suitable quantity. By high energy ionizing radiation is meant radiation of the type that provides emitted particles or photons having intrinsic energy of a magnitude greater than the planetary electron binding energies that occur in the reacting material. Such radiation is available from various radioactive substances which emit beta or gamma radiation as, for example, radioactive elements including cobalt 60 and cesium 137, nuclear reactor fission products, and the like. If it is preferred or more expedient, however, high energy ionizing radiation from an electron beam generator such as a Van de Graaff accelerator, an X-ray generator, a resonant transformer, or a linear accelerator may also be used.

Under preferred operating conditions, the process may be run either as a batch operation as shown in the following examples or it may be carried out in continuous fashion wherein the reactants are continuously fed into a reaction zone containing liquid tetrachloroethylene and from which a reaction product is continuously withdrawn.

*Example 1*

A pressure reactor equipped with a stirrer, gas inlet sparger, and means for measuring temperature was charged with 3 liters of tetrachloroethylene, flushed free of air with tetrafluoroethylene, then closed and pressured to 15 pounds gauge with gaseous tetrafluoroethylene. The mixture was stirred at this pressure while being irradiated at about room temperature with a cobalt 60 source at a dose rate of 0.025 megarad per hour, tetrafluoroethylene being continuously admitted as needed to maintain the original pressure. After irradiation in this manner for 65.5 hours, the radiation source was removed and the reactor was vented. The reaction mixture was a white viscous suspension of finely divided solid in excess perchloroethylene. When this suspension was spread on a glass plate and the excess tetrachloroethylene allowed to evaporate, a thick greasy residue remained. This was a mixture of a polymeric oil of relatively low molecular weight and fine particles of white solid. The solid product when separated and dried was found to be composed largely of particles 1–10 microns in size. The material had a greasy feel and was exceptionally water-repellent. It melted at 160–170° C. Elemental and spectroscopic analyses showed that it had the structure $$Cl_2C=CCl(C_2F_4)_nCl$$

wherein $n$ had an average value of ten.

*Example 2*

Example 1 was repeated with the exception that the irradiation was continued for a total time of 140 hours. The reaction product was similar to that previously obtained, but the yield was approximately trebled, about 150 grams of dried solid being produced. Analysis showed that the average molecular weight of this material was slightly lower than that of the product of Example 1.

*Example 3*

The procedure of the above examples was repeated using a total radiation time of 168 hours. The solid product was similar in its properties and amount to that of Example 2. It melted at 153–160° C. Analysis revealed that it had an average molecular weight lower than the products of Examples 1 and 2 and its average structure was represented by the formula $$Cl_2C=CCl(C_2F_4)_5Cl$$

Reaction times shorter than those shown in the above examples are obtained by using radiation of higher intensity.

All the above products were characterized by a greasy feel and by their extreme water-repellency. The lower molecular weight fractions were at least partially soluble in perchloroethylene and such solutions or suspensions were used to impregnate cotton fabric and absorbent paper. Both fabric and paper thus impregnated showed exceptional resistance to wetting when dried. Heating the impregnated materials improved their water resistant properties. Similarly impregnated sand acted as a selective filter effective in breaking oil-water emulsions, allowing the oil to pass through while retaining the water.

I claim:
1. A telomer of tetrafluoroethylene and tetrachloroethylene of the formula $Cl_2C=CCl(C_2F_4)_nCl$ wherein $n$ is a number from about 2 to about 20.
2. A process of making a telomer of tetrafluoroethylene and tetrachloroethylene of the formula

$$Cl_2C=CCl(C_2F_4)_nCl$$

wherein $n$ is a number from about 2 to about 20, which process comprises reacting by contacting tetrafluoroethylene and tetrachloroethylene at about $-20°$ C. to about $150°$ C. in the presence of a field of high energy ionizing radiation of an intensity between about 0.005 and 10 megarads per hour.
3. The process of claim 2 wherein the temperature is 10–50° C.
4. The process of claim 2 wherein the reaction is carried out under superatmospheric pressure.

References Cited by the Examiner
UNITED STATES PATENTS
2,438,021   3/1948   Roland _____ 260—654

OTHER REFERENCES
Lovelace: Aliphatic Fluorine Compounds, pages 37–40 (1958), Reinhold Pub. Co., New York, N.Y.

LEON ZITVER, *Primary Examiner.*
DANIEL D. HORWITZ, *Examiner.*